Aug. 10, 1954       G. M. SALAMONOVICH       2,686,282
SHAFT ROTATION FUNCTION GENERATOR
Filed July 22, 1950                          4 Sheets-Sheet 1

*INVENTOR.*
GEORGE M. SALAMONOVICH
BY
*William R. Lane*
ATTORNEY

Aug. 10, 1954   G. M. SALAMONOVICH   2,686,282
SHAFT ROTATION FUNCTION GENERATOR
Filed July 22, 1950   4 Sheets-Sheet 2

*INVENTOR.*
GEORGE M. SALAMONOVICH
BY
*William R. Lane*
ATTORNEY

Aug. 10, 1954   G. M. SALAMONOVICH   2,686,282
SHAFT ROTATION FUNCTION GENERATOR
Filed July 22, 1950   4 Sheets-Sheet 3
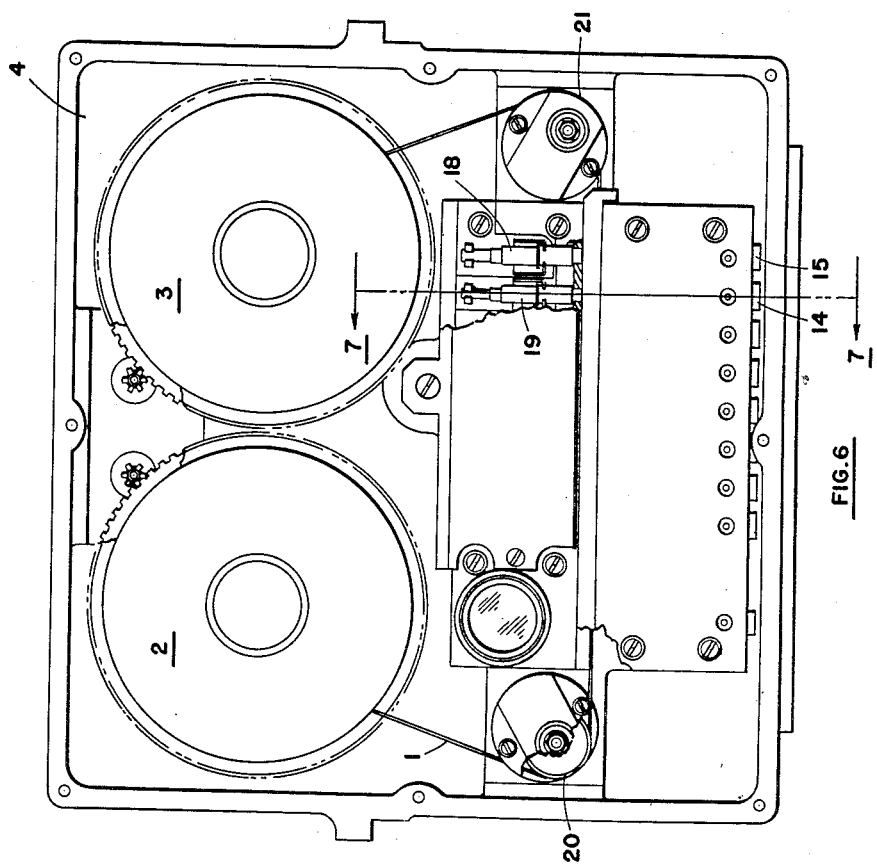
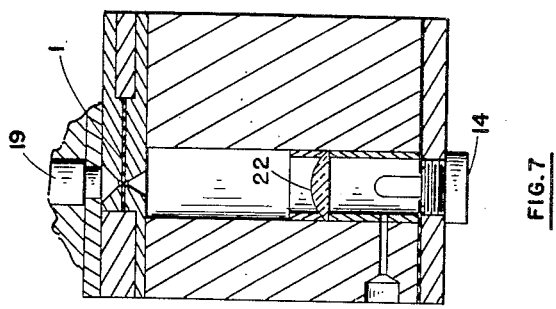
*INVENTOR.*
GEORGE M. SALAMONOVICH
BY
*William L. Lane*
ATTORNEY Patented Aug. 10, 1954

2,686,282

UNITED STATES PATENT OFFICE 2,686,282

SHAFT ROTATION FUNCTION GENERATOR

George M. Salamonovich, Hollywood, Calif., assignor to North American Aviation, Inc.

Application July 22, 1950, Serial No. 175,407

8 Claims. (Cl. 318—162)

This invention pertains to the production of an accurate shaft rotation which is a predetermined function of another shaft rotation. It pertains particularly to a device for converting into a shaft rotation a film recorded series of signals.

In a co-pending application Serial No. 173,604, now Patent No. 2,592,018, entitled "Function Printer," filed July 13, 1950, in the name of Avard F. Fairbanks, there is disclosed a device for recording upon film a series of opaque and transparent strips or dashes for use in connection with this invention. The problem of which this invention is a solution is that of securing a shaft rotation which is an exact algebraic or trigonometric function of the distance traveled by the film as it is being read. This shaft rotation must be obtained despite variations in the rate of film travel, and without any human control. It is therefore an object of this invention to provide automatic means for obtaining a shaft rotation which is an exact predetermined function of a second shaft rotation.

It is another object of this invention to provide means for transforming into a shaft rotation a film record of alternate transparent and opaque strips.

Other objects of invention will become apparent from the following description taken in connection with the accompanying drawings, in which:

Fig. 6 is a cutaway plan view of the invention;

Fig. 7 is a sectional view taken at 7—7 in Fig. 6; and

Figure 1:
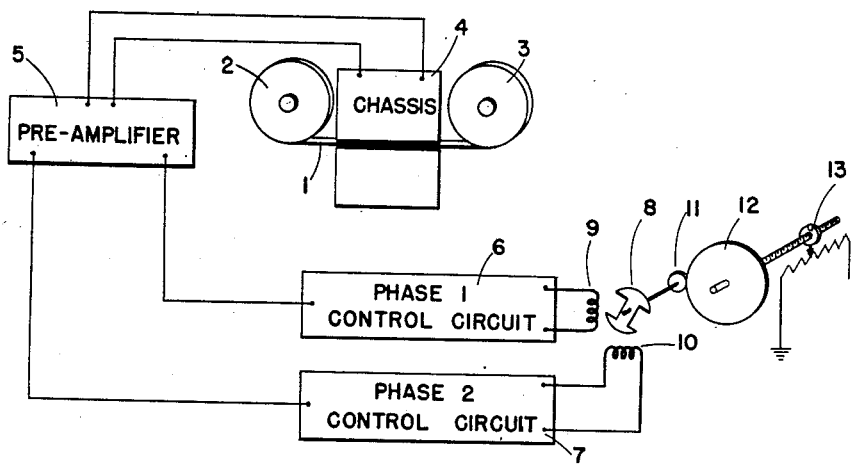
Fig. 1 is a schematic block diagram of the invention.
Figure 2:
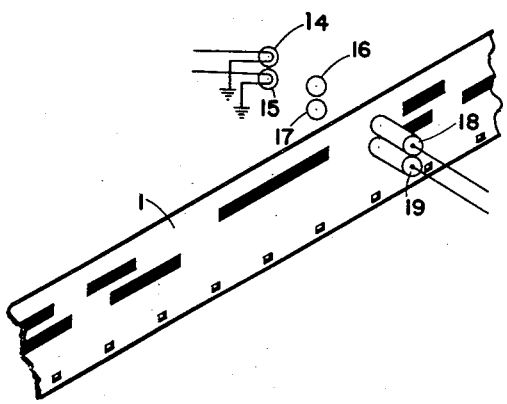
Fig. 2 is a detailed schematic of the film strip record of this invention.

Referring now to the drawings, and in particular to Figs. 1 and 2, a film strip 1 having at least two channels of detectable alternate transparent and opaque strips thereon is wound on reels 2 and 3 so that it passes through chassis 4 in winding from one reel to the other. Chassis 4 contains strip detecting means such as phototubes whose output is amplified in amplifier 5 and fed to control circuits 6 and 7. A D. C. synchromotor 8 with its stator windings 9 and 10 connected to the output of control circuits 6 and 7, respectively, drives a potentiometer 13 by means of gears 11 and 12. Film 1 is shown in detail in Fig. 2 with illuminating lamps 14 and 15, lenses 16 and 17, and photoelectric cells 18 and 19. Although film 1 is shown with only two channels recorded thereon it is to be understood that a larger number of channels could conveniently be recorded on a single film side by side.

Referring now to Fig. 6, chassis 4 is shown in greater detail with reels 2 and 3 and film 1. Film 1 rides on idler sprockets 20 and 21 and passes along a bank of photoelectric cells, of which photoelectric cells 18 and 19 are typical. A battery of very small lamps, such as "wheat grain" lamps, project their light through film 1 to the photoelectric cells. Lamps 14 and 15 are typical, and lamp 14 is shown by way of example in Fig. 7 where light from the lamp passes through lens 22 to film 1 and thence to photoelectric cell 19. The photoelectric cells of which photoelectric cells 18 and 19 are typical therefore generate a signal which indicates whether a transparent or opaque portion of the film is passing between the "wheat grain" lamps and the photoelectric cells.

Figure 8:
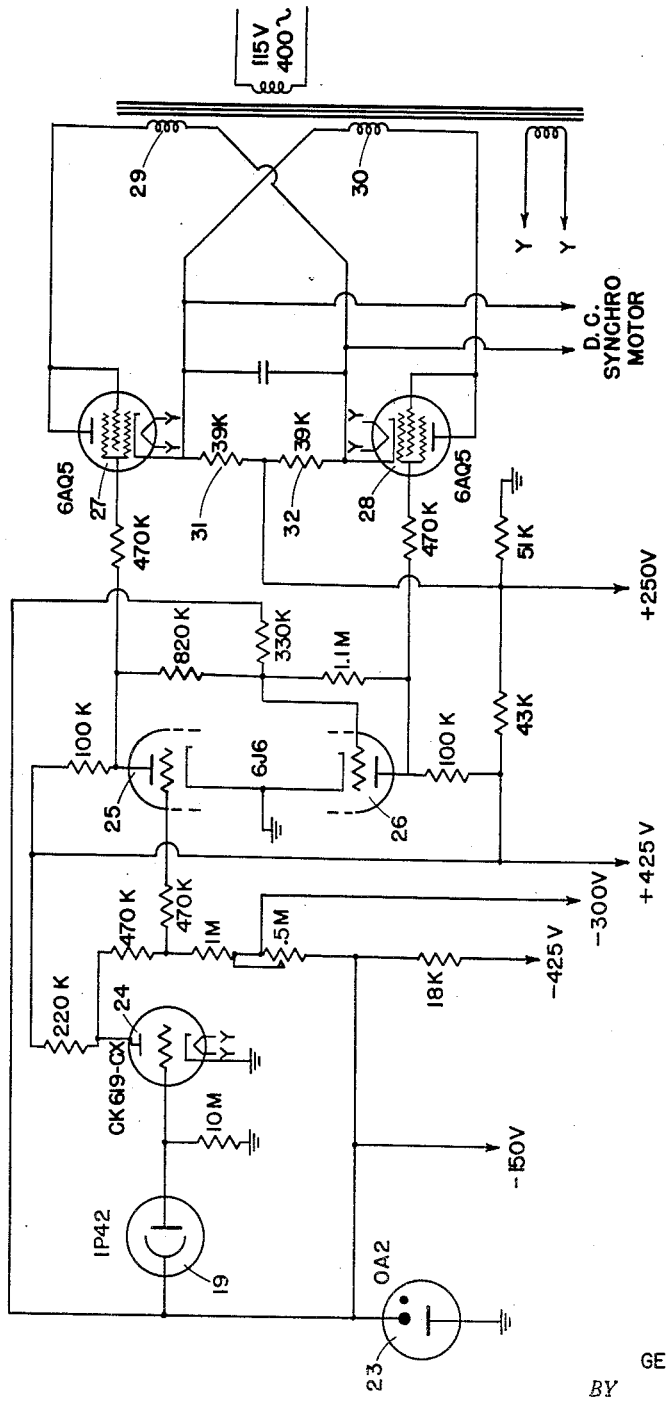
Fig. 8 is a detailed circuit diagram of a control circuit of the invention.

Referring now to Fig. 8, photoelectric cell 19 is shown typically in a circuit diagram of either control circuit 6 or control circuit 7, as shown in Fig. 1. A potential of approximately −150 v. is applied to photoelectric cell 19 and is held at that value by voltage regulator 23. The output of photoelectric cell 19 is fed to a triode 24 and thence to a phase inverter comprising triodes 25 and 26, the outputs of which control the passage of current through pentodes 27 and 28. Pentodes 27 and 28 control the direction in which current is allowed to pass through one of the windings—say, for example, winding 9 of the stator of D. C. synchromotor 8.

It may be observed that at any one position along a film, four different conditions may obtain for each pair of recorded channels; namely, channel 1 may be opaque and channel 2 transparent; channel 1 may be transparent and channel 2 opaque; both channels may be transparent; and both channels may be opaque. Likewise, it may be observed that D. C. synchromotor 8 is capable of four different angular positions, each 90° apart, depending upon the directions of flow of current through the two stator windings. In Fig. 1, for example, the current in winding 9 may be flowing downward, and in winding 10 to the right; secondly, the current in winding 9 may be flowing upward, and in winding 10 to the left;

thirdly, the current in winding 9 may be upward, and that in winding 10 to the right; and fourthly, the current in winding 9 may be downward, and in winding 10 to the left. Bearing these observations in mind it becomes apparent that with the proper control circuit, motor 8 may be caused to rotate in 90° steps in response to the various conditions recorded on film 1. In operation, a photoelectric cell such as photoelectric cell 19 of Fig. 8 picks up one of the recorded channels, and assuming that a transparent portion of the strip is opposite it in chassis 4, a change in potential on the grid of triode 24 results. With typical circuit values as shown in Fig. 8 the voltage on the grid of triode 24 would be approximately −1.5 v. when no light is falling on photoelectric cell 19. When photoelectric cell 19 is illuminated, however, the voltage on the grid of triode 24 goes to approximately −3 v., making the plate of triode 24 more positive. When this plate goes positive the grid of triode 25 goes less negative, allowing current to flow through triode 25. The plate of triode 25 therefore becomes more negative, thus completely preventing conduction of triode 26, the grid of which is connected indirectly to the plate of triode 25. In addition, the plate of triode 25 is connected indirectly to the grid of pentode 27, and when the plate of triode 25 becomes more negative pentode 27 is prevented from conducting and no curent flows trough pentode 27. Meanwhile, triode 26 is cut off, as previously explained. In this condition the plate voltage is at a relatively high value—say, for example, +300 v., and pentode 28 is allowed to conduct. The tube conducts from the cathode to the plate of pentode 28, through power transformer winding 30, through resistances 31 and 32, and in parallel through the winding of D. C. synchromotor 8. It will be noted that the cathodes of pentodes 27 and 28 are connected through resistances 31 and 32 to a positive voltage source held at a potential of +250 v. so that if the plate voltage of triode 26 is +300 v. it can be seen that heavy current flow occurs through pentode 28. Likewise, if triode 25 is in condition to conduct, its plate voltage is lowered to approximately +200 v., and pentode 27 is positively prevented from conducting.

The discussion thus far has been concerned with what happens when photoelectric cell 19 is illuminated. A similar analysis is applicable when photoelectric cell 19 is not illuminated, except that when photoelectric cell 19 is not illuminated, triode 25 does not conduct, but triode 26 does conduct. Likewise, pentode 27 conducts and pentode 28 does not conduct. This results in a current flow from cathode to plate in pentode 27 through power transformer winding 29, through resistances 32 and 31, respectively, and in parallel through winding 9 of D. C. synchromotor 8 in the opposite direction from that achieved above when pentode 28 was conducting and pentode 27 was not conducting. It is thus seen that the direction of current flow in winding 9 of synchromotor 8 is effectively controlled by the presence or absence of light falling upon photoelectric cell 19. In other words, when a transparent strip of film is presented to the photoelectric cell, pentode 28 conducts, sending current counterclockwise in Fig. 8; and when photoelectric cell 19 is not illuminated, pentode 27 conducts, sending current clockwise in Fig. 8.

Figure 3:
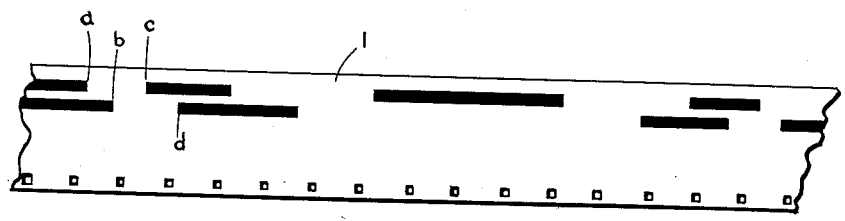
Fig. 3 is a plan view of a piece of film recorded for use in this invention.
Figure 4:
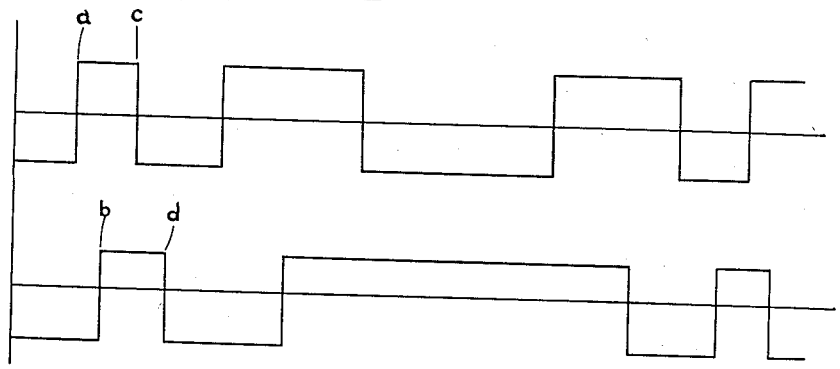
Fig. 4 is a rectangular plot of the photoelectric cell output of this invention.
Figure 5:
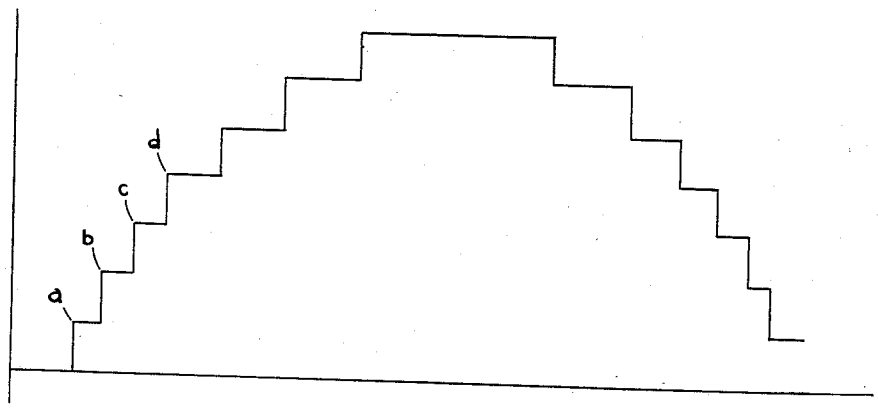
Fig. 5 is a plot of the resultant shaft rotation of this invention.

The meaning of Figs. 3, 4 and 5 now becomes apparent. One recording channel on the film in Fig. 3 controls but one of the synchromotor stator windings. Therefore, in order to control the rotation of the synchromotor, two channels are required. In Fig. 4, the voltages impressed upon the stator windings of synchromotor 8 are plotted to correspond with the film record shown in Fig. 3—the upper line of Fig. 4 coresponding to the upper channel in Fig. 3, and the lower line in Fig. 4 corresponding to the lower channel in Fig. 3. For convenience in explanation, let it be assumed that one stator winding of synchromotor 8 is aligned east and west, and the other north and south; and that the position of a pointer affixed to the shaft of synchromotor 8 always assumes a direction which is the resultant of north-south and east-west vectors representing the respective currents. At the far left in Fig. 3, both photoelectric cells 18 and 19 are darkened. Current in the two windings would therefore be west and south, respectively. At point $a$ in Fig. 3, however, the upper channel becomes light, reversing the current in one winding so that now, for instance, the direction of the vectors representing the currents in windings would be north and west, and the resultant would have changed from southwest to northwest. At point $b$, a similar change occurs, and the vectors now would be north and east, with the resultant northeast, and the shaft would have traversed a total of 180°. At point $c$, the current in the one winding is again changed, and the respective directions of the vectors representing currents in the windings would be east and south, and the resultant thereof would be southeast. Again, at $d$ the direction of one of the vectors again changes and the directions are again south and west, bringing the pointer representing the direction of the resultant vector through 360° of arc to its initially assumed position of southwest.

In Fig. 5, there is plotted the resultant rotation of the shaft of synchromotor 8 when film 1 is drawn through chassis 4, as previously explained. The motion of the shaft of synchromotor 8 is in 90° steps, and it can be seen that the pattern shown in Fig. 3 results in an approximate sine function of the travel of film 1. Time is plotted as abscissas, with the same scale in Figs. 3, 4 and 5, it being understood that distance and time are proportional if the film velocity is constant. While the plot of Fig. 5 shows a rough approximation of a sine function in relatively large steps, it is to be understood that the number of steps can be increased indefinitely, thereby increasing proportionally the accuracy of the resultant function. In other words, as the number of steps is increased the relative size of each step in comparison to the actual value of the function generated decreases. It is to be observed further that if the direction of travel of film 1 is reversed, the direction of the shaft rotation of synchromotor 8 automatically reverses also. Further, by use of an appropriate printed record on the film the direction of the shaft rotation of synchromotor 8 may be caused to reverse, although the direction of travel of film 1 remains the same. This system may therefore be used to secure a shaft rotation of synchromotor 8 which is proportional to any function of the travel of film 1, or a shaft rotation such as the shaft rotations of reels 2 and 3 to which the film travel is proportional.

The broad scheme of this invention may also be employed with other control circuits including relays or other means for controlling the direction of current flow in the motor windings in response to signals originating in the photoelectric cell. In addition, instead of photoelectric cells used in conjunction with a film for the purpose of furnishing a signal to be utilized by the control circuits, a perforated tape may be employed in a manner well known to the art wherein flexible brushes make electrical contact through the tape perforations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for producing a rotation of a first shaft proportional to a predetermined function of the rotation of a second shaft comprising first and second photoelectric means, a strip of motion picture film upon which are photographically printed a first and second row of alternately transparent and opaque strips, said second shaft being connected to move said film in accordance with its rotation, drive means coupled to said second shaft turning said second shaft and moving said film past said photoelectric means, said first photoelectric means being positioned to detect the presence of transparent and opaque strips in said first row, said second photoelectric means being positioned to detect the presence of transparent and opaque strips in said second row, an electric motor, and electronic means connected between said first and second photoelectric means and said motor to change the rotation of said motor by a single step for each change detected by said first and second photoelectric means to thereby produce a shaft rotation which is a predetermined function of said second shaft rotation.

2. Means for producing a rotation of a first shaft proportional to any predetermined function of the rotation of a second shaft comprising a motion picture film upon which are printed two rows of predeterminately variably spaced transparent strips of predeterminately varying lengths, two photoelectric cells, means connected between said film and said second shaft for moving said film past said photoelectric cells, one said photoelectric cell being adjacent one said row to detect light passing therethrough, the second said photoelectric cell being adjacent the second said row to detect light passing therethrough, a synchro motor having two stator windings, and electronic means connected between said photoelectric cells and said windings to control the direction of current flow in one said winding in response to signals from one said photoelectric cell, and to control the direction of current flow in the second said winding in response to signals from the second said photoelectric cell, to thereby obtain a shaft rotation proportional to a predetermined function of said second shaft rotation.

3. A device as recited in claim 2 in which said electronic means comprises four grid controlled rectifiers, the first said rectifier being connected to the first said winding of said synchro to pass current in one direction, the second said rectifier being connected to said first winding to pass current in the other direction; the third said rectifier being connected to said second winding of said synchro to pass current in one direction, and the fourth said rectifier being connected to said second winding to pass current in the other direction; two phase inverters, the first said phase inverter being connected between said first photo- electric cell and said first and second rectifiers to cause said first rectifier to conduct only when said first photoelectric cell is illuminated and to cause said second rectifier to conduct only when said first photoelectric cell is not illuminated, the second said phase inverter being connected between said second photoelectric cell and said third and fourth rectifiers to cause said third rectifier to conduct only when said second photoelectric cell is illuminated and to cause said fourth rectifier to conduct only when said photoelectric cell is not illuminated.

4. Means for producing a rotation of a first shaft proportional to a predetermined function of the rotation of a second shaft comprising a motion picture film upon which are printed predeterminately variable spaced opaque strips in two rows; photoelectric means mechanically connected to said second shaft to move along said film in accordance with the rotation of said second shaft, light generating means positioned relative to said film and said photoelectric means so that light passes from said light generating means through the non-opaque portions of said film into said photoelectric means when said photoelectric means are adjacent said non-opaque portions, said photoelectric means generating electrical signals in response to light passing through said film into said photoelectric means; an electric motor; and electronic means connected between said photoelectric means and said motor to cause said motor to rotate in fractions of a revolution of a rate which is a function of the number of said opaque strips passing said photoelectric means to thereby produce a shaft rotation which is a predetermined function of said second shaft rotation.

5. Means for rotating a direct current synchro motor having two stator windings according to a predetermined function of the rotation of a reference shaft comprising a strip of motion picture film upon which has been photographically printed predeterminately spaced opaque strips of predetermined length aligned in rows longitudinally of said film, light generating means adjacent said film so that light passes through non-opaque portions of said film, two fixed photoelectric cells for detecting the passage of light through said film in each of said rows, means connected between said reference shaft and said film to move said film past said photoelectric cells in response to the rotation of said reference shaft, and electronic means connected between said photoelectric cells and said windings to reverse the direction of current flow in one said stator winding whenever one of said photoelectric cells detects an end of a said opaque strip and to reverse the direction of current flow in the second said stator winding whenever the second said photoelectric cell detects an end of a said opaque strip to thereby rotate said motor according to a predetermined function of said reference shaft rotation.

6. A device as recited in claim 1 in which said motor has first and second windings, said first winding being connected, through said electronic means to said first photoelectric means, to be energized with one polarity when said first photoelectric means is opposite a transparent strip and to be energized with the opposite polarity when said first photoelectric means is opposite an opaque strip, said second winding being connected, through said electronic means to said second photoelectric means, to be energized with one polarity when said second photoelectric means is opposite a second transparent strip and to be energized with the opposite polarity when said second photoelectric means is opposite an opaque strip.

7. A device as recited in claim 1 in which said electronic means comprises four grid controlled rectifiers; the first said rectifier being connected to a first winding of said motor to pass current in one direction, the second said rectifier being connected to said first winding to pass current in the other direction, the third said rectifier being connected to a second winding of said motor to pass current in one direction, and the fourth said rectifier being connected to said second winding to pass current in the other direction; two phase inverters; the first said phase inverter being connected between said photoelectric means and said first and second rectifiers to cause said first rectifier to conduct only when one particular photoelectric cell of said photoelectric means is illuminated and to cause said second rectifier to conduct only when said first particular photoelectric cell is not illuminated, the second said phase inverter being connected between said photoelectric means and said third and fourth rectifiers to cause said third rectifier to conduct only when a second particular photoelectric cell of said photoelectric means is illuminated and to cause said fourth rectifier to conduct only when said second photoelectric cell is not illuminated.

8. Means for producing a rotation of a first shaft proportional to a predetermined function of the rotation of a second shaft comprising a strip record upon which has been impressed predeterminately spaced detectable strips of predetermined length aligned in rows longitudinally of said film; stationary strip detecting means adjacent said film to detect the presence of said strips; electrical means connected to said strip detecting means; means mechanically connected between said second shaft and said strip record to move said strip record in response to the rotation of said second shaft; and motor means electrically connected to be driven in response to said electrical means and mechanically connected to rotate said first shaft an angular increment for each change in the condition as defined by the configuration of said strips detected by said strip detecting means to thereby produce a shaft rotation which is a predetermined function of the rotation of said second shaft.

References Cited in the file of this patent

UNITED STATES PATENTS

| Number | Name | Date |
|---|---|---|
| 1,859,930 | Miller | May 24, 1932 |
| 1,867,925 | Ruben | July 19, 1932 |
| 2,454,107 | Wald | Nov. 16, 1948 |
| 2,482,242 | Brustman | Sept. 20, 1949 |
| 2,574,104 | Ireland | Nov. 6, 1951 |

FOREIGN PATENTS

| Number | Country | Date |
|---|---|---|
| 401,016 | Great Britain | Nov. 9, 1933 |
| 910,768 | France | June 18, 1946 |